United States Patent [19]

Karolkiewicz et al.

[11] 4,315,824
[45] Feb. 16, 1982

[54] FILTRATION OF COAL-DERIVED LIQUIDS CONTAINING PARTICULATE SOLIDS

[75] Inventors: Walter F. Karolkiewicz, Trenton, N.J.; Pradip Rao, Media, Pa.

[73] Assignee: Hydrocarbon Research, Inc., Lawrenceville, N.J.

[21] Appl. No.: 156,158

[22] Filed: Jun. 3, 1980

[51] Int. Cl.³ .......................................... B01D 37/02
[52] U.S. Cl. ................................ 210/769; 210/778; 210/779
[58] Field of Search ............ 208/8 R, 8 LE; 210/695, 210/703, 768, 769, 770, 777, 778, 779

[56] References Cited

U.S. PATENT DOCUMENTS

| 3,951,799 | 4/1976 | Weiss et al. | 210/777 |
| 4,251,364 | 2/1981 | Carr et al. | 208/8 LE |
| 4,252,646 | 2/1981 | Carr et al. | 210/778 |
| 4,252,647 | 2/1981 | Carr et al. | 210/778 |
| 4,252,648 | 2/1981 | Carr et al. | 210/777 |
| 4,255,258 | 3/1981 | Carr et al. | 208/8 LE |
| 4,260,485 | 4/1981 | Carr et al. | 208/8 LE |

Primary Examiner—Ivars C. Cintins
Attorney, Agent, or Firm—Vincent A. Mallare; Fred A. Wilson

[57] ABSTRACT

A method of filtering a coal-derived liquid comprising; mixing the coal liquid with a filter aid material comprising metallic particles; filtering the thus-obtained mixture; subjecting the resulting filter cake material to partial combustion; and separating the metallic particles from the filter cake for reuse as filter aid.

7 Claims, 1 Drawing Figure

FILTRATION OF COAL-DERIVED LIQUIDS CONTAINING PARTICULATE SOLIDS

BACKGROUND OF THE INVENTION

1. Field of the Invention

The present invention is directed to a method of filtering heavy hydrocarbon liquids containing particulate solids. More particularly, the invention is directed to a process for filtering coal liquefaction products to remove particulate ash and unconverted coal solids using fine metallic particle filter aid material, and for recovering the metallic filter aid for reuse in the filtration of coal liquefaction products.

2. Description of Prior Art

The use of filtration as a method for deashing coal liquefaction products is known. For example, U.S. Pat. No. 3,960,701 discloses a process for forming coke and electrode carbon from coal, in which coal-derived liquid is filtered using rotary drum and precoated thimble type filters. Also, U.S. Pat. No. 3,962,070 to Stotler discloses a process for the hydrogenation of coal in which unconverted coal solids are separated from the recycled residuum liquid using a liquid cyclone separator and a rotary drum type filter. Usually, a filter aid material, such as diatomite or volcanic ash particles, is mixed with the coal liquefaction product and the unconverted coal and ash solids are removed by filtration. By using a suitable filter aid material, it was found that rapid plugging of the filtering medium surface is avoided and adequate liquid filtration rates can be obtained.

Estimates have indicated that for coal liquefaction plants having 1,000,000 barrel per day total product capacity, the requirement for diatomite filter aid material would amount to a large percentage of the total diatomite production of the United States. Although regeneration and reuse of diatomite filter aid has been suggested, it has been found that the regenerated diatomite has a much lower effectiveness than the fresh material. Accordingly, there is a need for a filter aid material which can be regenerated simply and cheaply without decreasing significantly its effectiveness as a filter aid material, such filter aid material being suitable for use in the deashing of hydrocarbon liquid products from coal liquefaction processes.

SUMMARY OF THE INVENTION

According to the present invention, fine metallic particles or powders are used as filter aid material for filtering hydrocarbon liquids containing particulate solids. More particularly, it has been found that fine stainless steel particles having particle size range of 10 to 400 mesh (U.S. Sieve Series) can be preferably utilized as a filter aid material in a filtering step for coal-derived liquids containing fine particulate ash and unconverted coal solids. The amount of metallic particle filter aid needed is related to the total particulate solids to be removed from the liquid, and should be between about 0.5 and 4 times the weight of particulate solids, and preferably about 1 to 3 times the weight of ash and unreacted coal solids in the liquid being filtered.

The filter aid material can be recovered for reuse by subjecting the filter cake derived from a liquid filtration step to partial oxidation and/or combustion to remove the carbonaceous portion. The metal particle filter aid material can then be removed from the resulting ash by known separation practices, such as by fluidization, magnetic separation and the like.

As a result, there is provided a filtration method for coal-derived liquid products which does not require the use of large quantities of non-recoverable filter aid materials such as diatomite. In addition, the present invention provides a filter aid material which can be used and recovered without any significant decrease in its effectiveness.

DETAILED DESCRIPTION OF THE INVENTION

Figure 1:
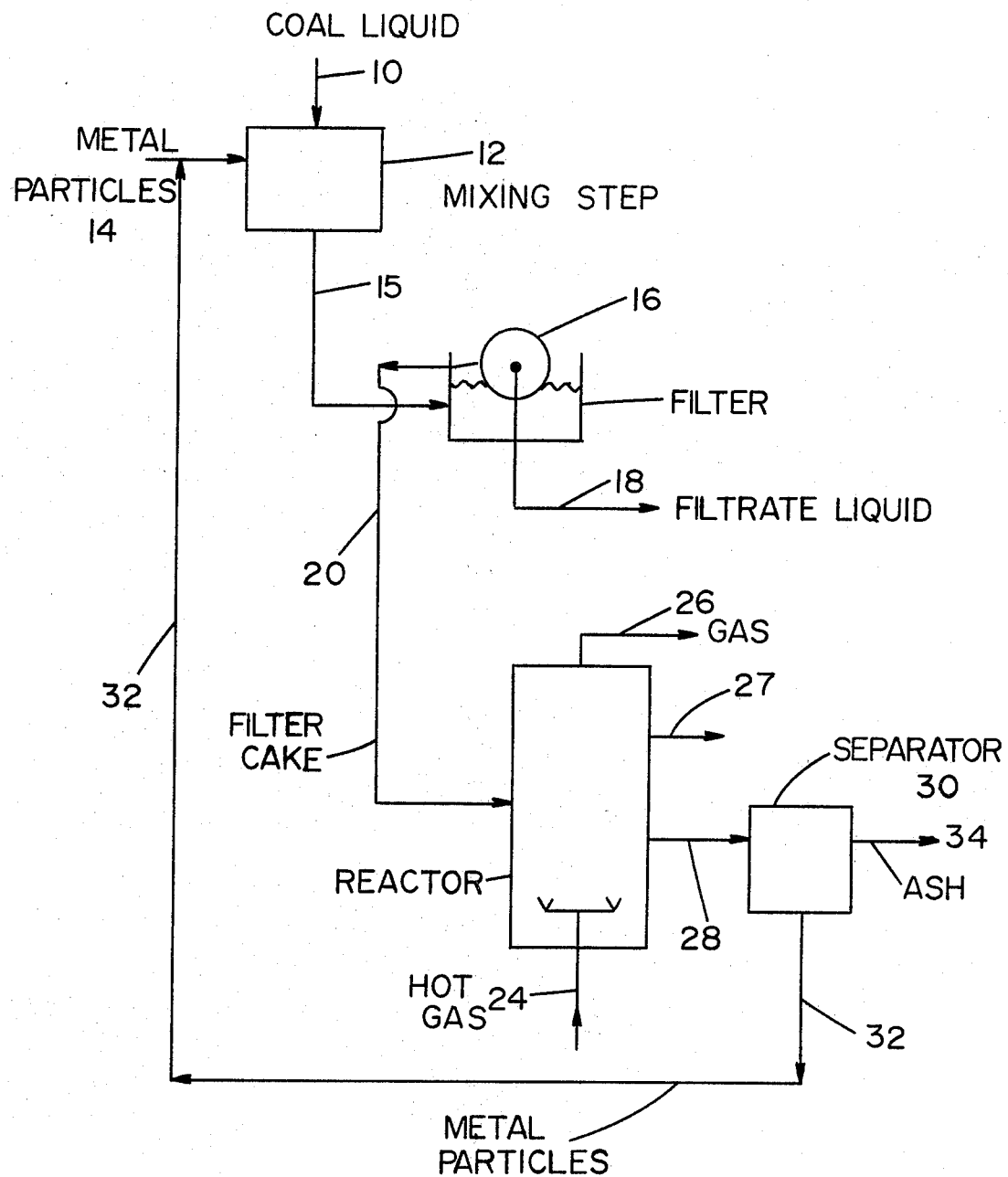
FIG. 1 is a schematic flow diagram of a coal liquid filtration process using metal particles as filter aid material, and including recovery and reuse of the metal particles.

The present invention discloses use of fine metallic particles filter aid material for filtering coal-derived hydrocarbon liquids, and preferably uses stainless steel particles. The preferred metal particles are of irregular shape and have a particle size ranging from about 10 mesh to 400 mesh, i.e., substantially all passing through No. 10 screen and being retained on No. 400 screen, U.S. Sieve Series. In a preferred embodiment, the metal particles have a size ranging from about 100 mesh to about 325 mesh. The irregular shape of the metal particles is necessary in order to increase the porosity of the filter cake produced and to provide support for filtering the finer coal particles, so as to avoid blanking of the filter cake and interrupting filtrate liquid flow. An example of a useful metal powder is Type 316 stainless steel powder having particle size of 100–325 mesh (U.S. Sieve Series).

In the method of this invention, the metallic particle filter aid material is intimately mixed with a hydrocarbon liquid stream containing particulate solids, such as produced in the liquefaction of coal. In general, this coal-derived liquid has the following composition:

Distillate, W %: 75–10
Residuum, W %: 15–55
Solids, W %: 10–35

The weight ratio of metal particles used to the solids being filtered should be from about 0.5 to 4:1, and preferably from about 1:1 to 3:1.

The mixture of coal liquid and metal particles is then subjected to a filtration step. Filter types useful in this invention include plate, pressure leaf and rotating drum type filters, with the drum type filter being preferred for large capacity flow rates, such as exceeding about 500 pound/hour.

To recover the metallic particle filter aid material for reuse, the filter cake is subjected to partial oxidation and/or combustion to remove the oil portion. The filter aid material may then be removed from the ash particles by standard practices, such as fluidization, magnetic separation and the like. The separated metallic particles can then be recycled for reuse as filter aid material in the mixing step at the beginning of the filtration process.

The figure illustrates a preferred embodiment of the present invention. As shown in FIG. 1, a coal-derived liquid stream 10 containing unreacted coal and ash particles and having a temperature ranging from about 400° to 975° F. is fed to mixing chamber 12. Irregularly shaped metal particles at 14 having a particle size ranging from −100 mesh to 325 mesh are also introduced into the mixing chamber. The weight ratio of metal particles to coal-derived liquid is from about 1:1 to 3:1. The resulting mixture is withdrawn from the mixing chamber as stream 15 and is fed to rotating drum type filter 16. The coal-derived liquid filtrate exits the filter via stream 18. The filter cake material is removed from filter 16 as stream 20.

The filter cake material at 20 is broken up into small pieces, i.e., to an average particle size of from about −10 to about 150 mesh, and fed to reactor 22 for recovery of the metalic filter aid material. A hot gas such as flue gas having a temperature of from about 650° F. to about 2000° F. is fed to the bottom of reactor 22 via stream 24 to fluidize the filter cake material. The filter cake material is generally heated to a temperature of from about 500° to about 1800° F. The amount of oxygen allowed into reactor 22 is controlled so as to permit the oxidation of the hydrocarbon material adsorbed on the metal particles without damage to the particles.

The fluidizing gas exits the reactor 22 via stream 26. The filter cake material, having undergone partial combustion is withdrawn from the reactor 22 via stream 28, and is fed to separator 30. The hot filter cake material, now comprising the metal particles, ash and remaining hydrocarbon materials is separated into its individual components in separator 30. Separator 30 may be a conventional separator, such as magnetic separator and/or flotation type separator. The metal particles so separated are removed at 32 and can be recycled to mixing chamber 12 for reuse, whereas the ash and hydrocarbon materials exit the separator via stream 34.

If the reactor 22 is operated at sufficiently high temperature to cause the ash particle to agglomerate and form larger particles, then the upflowing hot gas may carry the fine metal particles out the top of the reactor. The hot gas stream is then passed to a cyclone gas-solids separation step (not shown) from which the metallic particles are removed as the underflow stream and reused as filter aid material.

The present invention is illustrated by the following example, which is for illustrative purposes only and should not be construed as limiting the scope of this invention.

EXAMPLE

A coal-derived liquid containing about 25 W % solids is mixed with a mixture of stainless steel fines, preferably Type 316 stainless steel, having particle size range between 100 and 325 mesh (U.S. Sieve Series). The stainless steel fines are added to the solids-containing coal-derived liquid in 2:1 weight ratio, based on the weight percent ash and unconverted coal solids in the liquid. The mixture is then filtered in a suitable plate type or pressure leaf filter, or preferably in a drum type filter. The ensuing streams are a clean, solids-free liquid stream and a high solids-containing filter cake material. The filter cake is collected and broken up, preferably in sizes from −10 to 150 mesh size. The reduced filter cake is then passed to a fluidized combustor, in which hot gases at 650° F. to 2000° F. temperature range are introduced into the bottom end. The carbonaceous material is combusted to produce gas, while the metallic particles and ash fall to the bottom of the combustor. The stainless steel fines will usually exit the bottom of the combustor with the ash stream and are separated from the ash by fluidization means.

Although this invention has been described in terms of the accompanying drawing and preferred embodiment, it will be appreciated by those skilled in the art that many modifications and adaptations of the basic process are possible within the spirit and scope of the invention, which is defined solely by the following claims.

What we claim is:

1. A method of filtering a hydrocarbon liquid containing solid particles, comprising:
   (a) mixing the liquid with a filter aid material comprising metallic particles;
   (b) filtering the mixture from (a) to produce a filtrate liquid and a filter cake residue containing solids and the metallic particles;
   (c) heating the filter cake obtained from (b) to a temperature between 650° and 2000° F. to gasify the hydrocarbon material contained therein; and
   (d) separating the metallic particles from the product of (c).

2. The process of claim 1, wherein the liquid is derived from coal and the weight ratio of filter aid to ash and unconverted coal solids in the liquid feed is about 0.5 to 4:1.

3. The process of claim 1, wherein the metallic particles are stainless steel fines having irregular shapes and a particle size ranging from about 10 mesh to 400 mesh (U.S. Sieve Series).

4. The process of claim 1, including the additional step to recycling the metallic particles obtained in (d) to step (a) as the filter aid material.

5. The process of claim 1, wherein the metallic particles in (d) are separated by means of flotation.

6. The process of claim 1, wherein the metallic particles in (d) are separated by means of a magnetic separation.

7. A method of filtering a coal-derived liquid containing solid particles, comprising:
   (a) mixing the liquid with a filter aid material comprising metallic particles having size range of 10 to 400 mesh;
   (b) filtering the mixture from (a) to produce a filtrate liquid and a filter cake residue containing unconverted coal and ash solids and the metallic particles;
   (c) heating the filter cake obtained from (b) to a temperature between 650° and 2000° F. to gasify the hydrocarbon material contained therein;
   (d) separating the metallic particles from the product of (c); and
   (e) recycling the recovered metallic particles to mixing step (a) for reuse.

\* \* \* \* \*